United States Patent

Okada

(10) Patent No.: US 9,959,904 B2
(45) Date of Patent: May 1, 2018

(54) REPRODUCTION CONTROL APPARATUS AND CONTROL METHOD FOR THE SAME

(71) Applicant: CANON KABUSHIKI KAISHA, Tokyo (JP)

(72) Inventor: Koichi Okada, Kunitachi (JP)

(73) Assignee: Canon Kabushiki Kaisha, Tokyo (JP)

(*) Notice: Subject to any disclaimer, the term of this patent is extended or adjusted under 35 U.S.C. 154(b) by 29 days.

(21) Appl. No.: 15/079,528

(22) Filed: Mar. 24, 2016

(65) Prior Publication Data

US 2016/0293211 A1    Oct. 6, 2016

(30) Foreign Application Priority Data

Mar. 30, 2015    (JP) ................................. 2015-069805

(51) Int. Cl.
| | |
|---|---|
| H04N 5/783 | (2006.01) |
| G11B 27/00 | (2006.01) |
| G11B 27/10 | (2006.01) |
| H04N 5/93 | (2006.01) |
| H04N 5/77 | (2006.01) |
| H04N 5/232 | (2006.01) |

(52) U.S. Cl.
CPC .......... *G11B 27/005* (2013.01); *G11B 27/102* (2013.01); *G11B 27/105* (2013.01); *H04N 5/232* (2013.01); *H04N 5/772* (2013.01); *H04N 5/93* (2013.01)

(58) Field of Classification Search
CPC ........ H04N 5/783; H04N 9/8042; H04N 5/85; G11B 27/005; G11B 2220/90
USPC ....................................................... 386/343
See application file for complete search history.

(56) References Cited

U.S. PATENT DOCUMENTS

| | | | |
|---|---|---|---|
| 2009/0113501 A1 | 4/2009 | Hanada et al. | |
| 2011/0085778 A1* | 4/2011 | Iwase | G11B 27/034 386/228 |
| 2015/0172738 A1* | 6/2015 | Mitsuhashi | H04N 21/26258 725/25 |

FOREIGN PATENT DOCUMENTS

| | | |
|---|---|---|
| EP | 1365411 A2 | 11/2003 |
| EP | 1519577 A1 | 3/2005 |

(Continued)

OTHER PUBLICATIONS

The above patent documents were cited in a European Search Report dated Jul. 20, 2016, that issued in the corresponding European Patent Application No. 16160190.1.

(Continued)

*Primary Examiner* — William C Vaughn, Jr.
*Assistant Examiner* — Daniel Tekle
(74) *Attorney, Agent, or Firm* — Cowan, Liebowitz & Latman, P.C.

(57) ABSTRACT

A reproduction control apparatus comprises an instruction unit configured to give an instruction so as to move a reproduction position of time series data; and a control unit configured to perform, when there is an instruction from the instruction unit to move the reproduction position forward, control to move a current reproduction position forward by a first period in a case where a remaining time from the current reproduction position to a terminal end is longer than a total period of the first period and a second period, and to move the current reproduction position to a position that is the second period before the terminal end in a case where the remaining time is less than or equal to the total period and longer than the second period.

12 Claims, 5 Drawing Sheets

(56) References Cited

FOREIGN PATENT DOCUMENTS

| | | |
|---|---|---|
| JP | 05-325508 A | 12/1993 |
| JP | 2007-115308 A | 5/2007 |
| JP | 2011-259110 A | 12/2011 |
| RU | 2189643 C2 | 9/2002 |
| WO | 03/021940 A2 | 3/2003 |
| WO | 2013/077047 A1 | 5/2013 |

OTHER PUBLICATIONS

The above documents were cited in the Feb. 13, 2017 Russian Office Action, which is enclosed with an English Translation, that issued in Russian Patent Application No. 2016111609.

* cited by examiner

REPRODUCTION CONTROL APPARATUS AND CONTROL METHOD FOR THE SAME

BACKGROUND OF THE INVENTION

Field of the Invention

The present invention relates to a reproduction control apparatus and control method thereof, particularly relates to a technique for controlling reproduction of time series data such as moving images and audio.

Description of the Related Art

Conventionally, with time series data such as moving images and audio, reproduction methods that are useful in searching for scenes, such as fast forward/fast rewind and jump reproduction, are utilized to enable a user to search for and reproduce desired scenes. Japanese Patent Laid-Open No. 2011-259110 describes a technique for performing fast forward or fast rewind reproduction that involves reproducing single images in a moving image while jumping at a jump interval that depends on the specified fast forward or fast rewind speed.

Also, in consideration of user friendliness, techniques have been proposed for reproducing different moving images or audio according to the situation in which the device is utilized. Japanese Patent Laid-Open No. 05-325508 describes a technique for improving operability when the user wants to check the recorded state of a recorded audio signal in the case where the reproduction operation is started after the end of a series of audio recording operations, by starting reproduction from the beginning of the section recorded as a result of the most recent recording.

One use case involves the user wanting to check recorded data in the vicinity of the terminal end of one moving image unit or audio unit. For example, being able to check the end section of audio that was recorded last in the case where the user wants to check the recorded state of audio that has been recorded, as described in the Japanese Patent Laid-Open No. 05-325508, enables the user to determine whether the audio was recorded as desired to the end or whether rerecording is necessary. Also, being able to check the last section of audio that was recorded last can be used to help decide the kind of audio to record in subsequent audio recording. The same applies to shooting of moving images.

However, when jump reproduction such as described in Japanese Patent Laid-Open No. 2011-259110 is performed, the vicinity of the terminal end of one moving image unit could possibly be jumped, and it may riot be possible to quickly and reliably check the vicinity of the terminal end of one moving image unit.

SUMMARY OF THE INVENTION

The present invention has been made in consideration of the aforementioned problems, and realizes a reproduction control that is able to quickly and reliably reproduce the vicinity of the terminal end of time series data, when there has been an instruction to move the reproduction position.

In order to solve the aforementioned problems, the present invention provides a reproduction control apparatus comprising: an instruction unit configured to give an instruction so as to move a reproduction position of time series data; and a control unit configured to perform, when there is an instruction from the instruction unit to move the reproduction position forward, control to move a current reproduction position forward by a first period in a case where a remaining time from the current reproduction position to a terminal end is longer than a total period of the first period and a second period, and to may the current reproduction position to a position that is the second period before the terminal end in a case where the remaining time is less than or equal to the total period and longer than the second period.

In order to solve the aforementioned problems, the present invention provides a control method of reproduction control apparatus comprising: giving an instruction so as to move a reproduction position of time series data; and performing, when there is an instruction to move the reproduction position forward, control to move a current reproduction position forward by a first period in a case where a remaining time from the current reproduction position to a terminal end is longer than a total period of the first period and a second period, and to move the current reproduction position to a position that is the second period before the terminal end in a case where the remaining time is less than or equal to the total period and longer than the second period.

In order to solve the aforementioned problems, the present invention provides a non-transitory computer-readable storage medium storing a program for causing a computer to function as an instruction unit and a control unit of a reproduction control apparatus, wherein the instruction unit gives an instruction so as to move a reproduction position of time series data, and the control unit performs, when there is an instruction from the instruction unit to move the reproduction position forward, control to move a current reproduction position forward by a first period in a case where a remaining time from the current reproduction position to a terminal end is longer than a total period of the first period and a second period, and to move the current reproduction position to a position that is the second period before the terminal end in a case where the remaining time is less than or equal to the total period and longer than the second period.

According to the present invention, it becomes possible quickly and reliably reproduce the vicinity of the terminal end of time series data, when there has been an instruction to move the reproduction position.

Further features of the present invention will become apparent from the following description of exemplary embodiments (with reference to the attached drawings).

DESCRIPTION OF THE EMBODIMENTS

Hereinafter, embodiments in which a reproduction control apparatus of the present invention is applied to a digital video camera that shoots digital video will be described in detail, with reference to the accompanying drawings.

Apparatus Configuration

First, the configuration and functions of the digital video camera (hereinafter, video camera) of the present embodiment will be described, with reference to FIG. 1.

Figure 1:
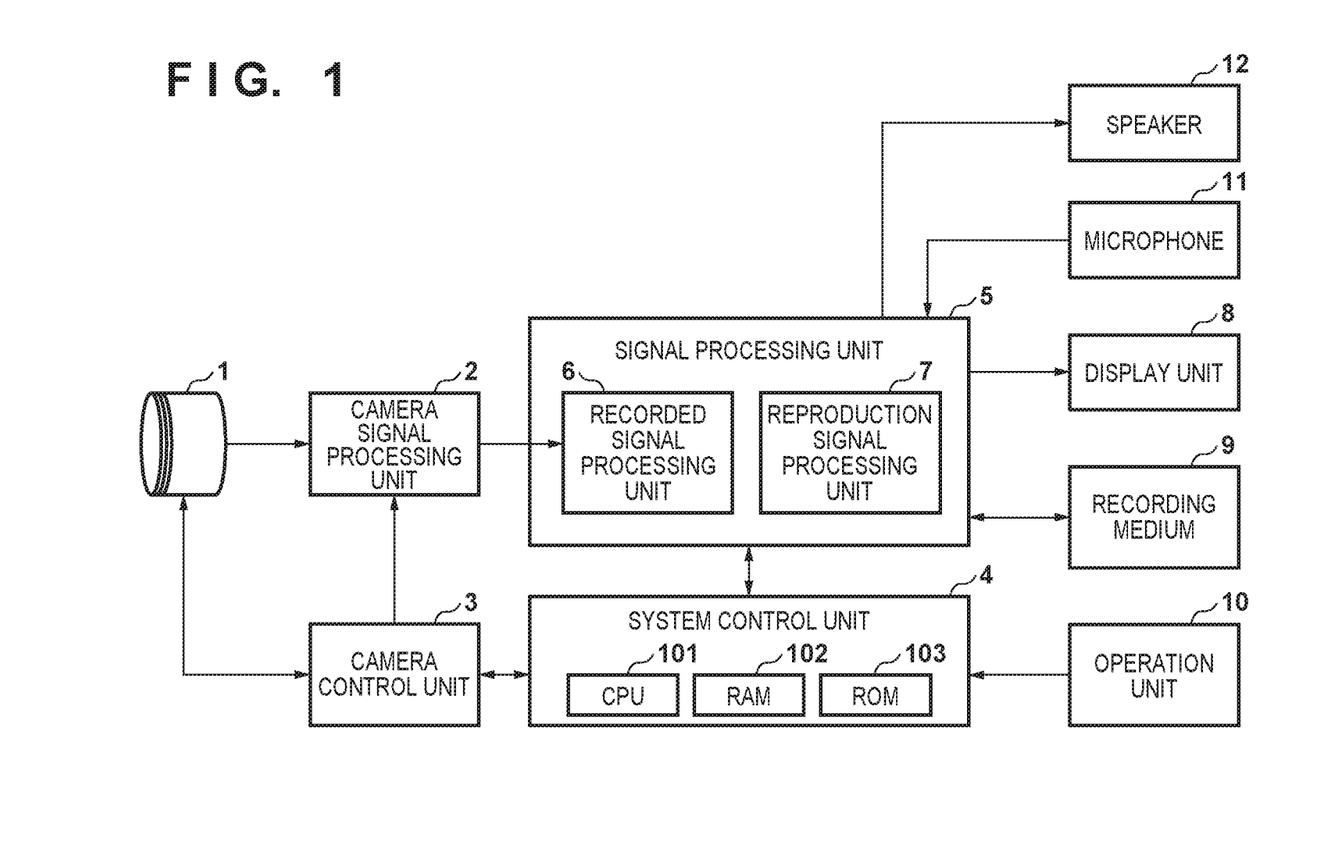
FIG. 1 is a diagram illustrating a system configuration of one embodiment.

In FIG. 1, an image capturing unit 1 includes a lens, an image capturing element such as a CMOS image sensor, an automatic focus (AF) mechanism and a zoom mechanism. The image capturing unit 1 adjusts focus, light amount and the like with respect to an object, converts an optical image of the object formed through the lens into video signals, and outputs the video signals to a camera signal processing unit 2, in accordance with instructions from a camera control unit 3.

The camera control unit 3 is provided with a microcomputer and the like, and controls a camera system in accordance with instructions from a system control unit 4, an operation unit 10 and the like.

A signal processing unit. 5 is provided with an integrated circuit, a microcomputer and the like, and performs record/reproduction processing of various signals containing time series data such as moving images and audio, in accordance with instructions from the system control unit 4. The signal processing unit 5 has a recorded signal processing unit 6 and a reproduction signal processing unit 7. The recorded signal processing unit 6 performs predetermined signal processing on video signals output from the camera signal processing unit 2 and audio signals output from a microphone 11, and the reproduction signal processing unit 7 performs predetermined processing on signals generated by the recorded signal processing unit 6. Also, the signal processing unit 5 performs record processing of video (moving image with audio) that has undergone predetermined processing to a recording medium 9 and reproduction processing of video recorded on the recording medium 9, in accordance with instructions from the system control unit 4. Also, the signal processing unit 5 superimposes character information and print range frame display information that is output from the system control unit 4 on video signals, and outputs the resultant signals to a display unit 8. Also, the signal processing unit 5 performs reproduction processing for outputting audio that is included in video or only audio from a speaker 12, in accordance with instructions from the system control unit 4.

The display unit 8, which is a liquid crystal panel or the like, displays video to a user, and performs display of various types of information of the camera itself using characters and symbols, guidance display at the time of menu setup, and the like.

Video generated by the signal processing unit 5 is recorded to the recording medium 9, and recorded video is read from the recording medium 9. The recording medium 9 is a memory card, a hard disk drive or the like that is mounted in the video camera, or a flash memory, a hard disk drive or the like built into the video camera.

A portion of the operation unit 10 includes various operation switches (UP button, RIGHT button, DOWN button, LEFT button, SET button, MENU button, REPRODUCE button, FAST FORWARD button/FAST REWIND button, STOP button, START/STOP button, REC REVIEW button, etc.) relating to switching between a camera mode and a reproduction mode, which will be discussed later, and the video camera as a whole, and outputs instructions from the user to the system control unit 4. A portion of the operation unit 10 includes various switches and dials relating to the camera system (AF ON/OFF, AE auto/lock, program AE, zoom, etc.), and outputs instructions from the user to the camera control unit 3 via the system control unit 4.

The microphone 11 and the speaker 12 input and output audio signals in the camera mode and the reproduction mode.

The system control unit 4 includes a CPU 101, a RAM 102, a ROM 103, dedicated circuits and the like for integratively controlling the various functions of the video camera. The CPU 101 executes various control sequences including a REC review function of the present embodiment by expanding and executing programs stored on the ROM 103, which is a nonvolatile memory, in the RAM 102 serving as a work memory.

Dedicated circuits may be respectively used for the camera signal processing unit 2, the camera control unit 3, the system control unit 4 and the signal processing unit 5, or a programmed general-purpose processor may be used.

Also, a plurality of functions may be realized by one circuit or processor, or one function may be realized by a plurality of circuits and/or processors.

REC Review

The REC review function of the present embodiment will be described, with reference to FIG. 3.

The REC review function is a function for checking recorded video (clips) by reproducing the recorded video quickly with a simple operation while still in the camera mode for performing video recording, without setting the video camera to an operational mode dedicated to reproduction (reproduction mode). The REC review is intended for checking a clip that has just been recorded, and involves reproducing the entire clip that is targeted for reproduction or only the last few seconds of the clip. The description will focus on a method for jumping the reproduction position in ten second units in a positive direction (forward from the current reproduction position) or in an opposite direction (backward from the current reproduction position) relative to a time axis during the REC review. Also, the REC review is defined as being a function that performs reproduction for 4 seconds or more at a minimum. Note that these times are provided, to facilitate description of the present embodiment, and different times may be set.

Figure 3:
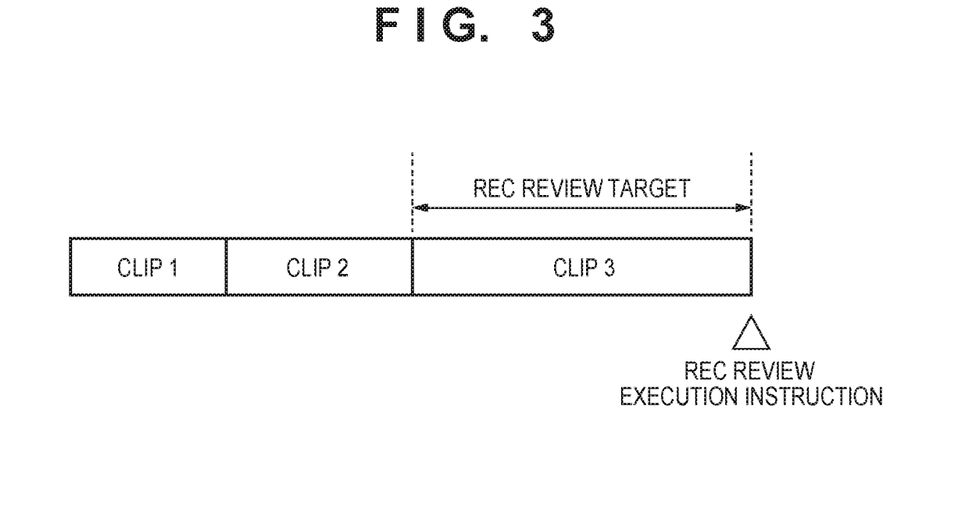
FIG. 3 is a diagram illustrating a clip to be reproduced in a REC review.

Clips 1 to 3 shown in FIG. 3 are moving image data that were shot/recorded with the video camera of the present embodiment. When the video camera is in the camera mode, clips are generated by the user pressing the START/STOP button in the operation unit 10 to instruct record start and record stop. FIG. 3 illustrates a situation in which record start and record stop instructions have been given three times, resulting in three clips 1 to 3 being recorded. When the user presses the REC REVIEW button included in the operation unit 10 in the camera mode after recording of the clip 3 is completed, only the clip 3 that has just been recorded is reproduced. In the REC review, reproduction is performed either from the beginning of the clip 3 or from four seconds before the terminal end of the clip 3, according to preset contents.

Figure 4:
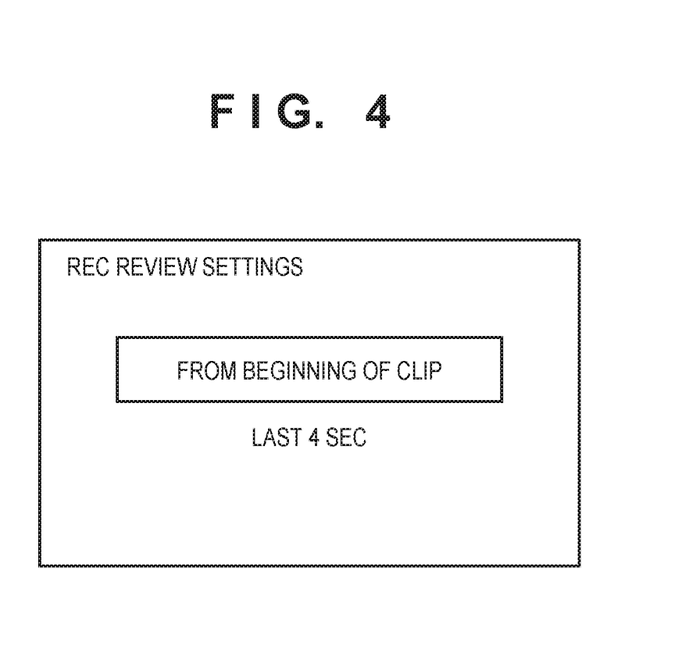
FIG. 4 is a diagram illustrating a menu screen for setting the REC review.
Figure 5A:
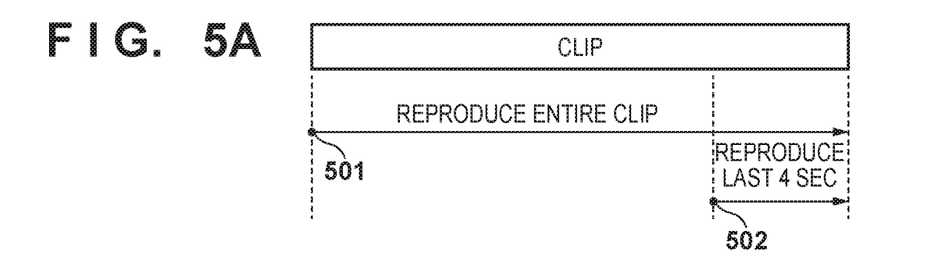
FIGS. 5A to 5C are diagrams illustrating clip reproduction processing in the REC review.

FIG. 4 shows exemplary display of a menu screen (one of the setting menus of the video camera) for setting the reproduction method of the REC review. When "from beginning of clip" has been selected on this menu screen, the range that is reproduced in the REC review will be from the beginning of the clip. In this case, reproduction will be performed from a position 501 shown in FIG. 5A. When "last 4 seconds" has been selected, REC review reproduction is executed from a point that is 4 seconds before the terminal end of the clip. In this case, the clip will be reproduced from a position 502 shown in FIG. 5A.

Normal reproduction processing that is executed after switching the operational mode from the camera mode to the reproduction mode differs in operational contents from the REC review. When the user presses the REPRODUCE button included in the operation unit 10 after the system control unit 4 has switched the operational mode of the video camera from the camera mode to the reproduction mode in response to an instruction from the operation unit 10, reproduction is started from the beginning of the clip that has been selected. When a plurality of clips have been recorded, the next clip is subsequently reproduced following the that is currently being reproduced, with reproduction processing differing from the REC review in that clips are reproduced one after another in chronological order.

Reproduction Processing

Next, reproduction processing in the case of executing REC review reproduction and in the case of executing normal reproduction will be described, with reference to FIGS. 2A and 2B.

Figure 2A:
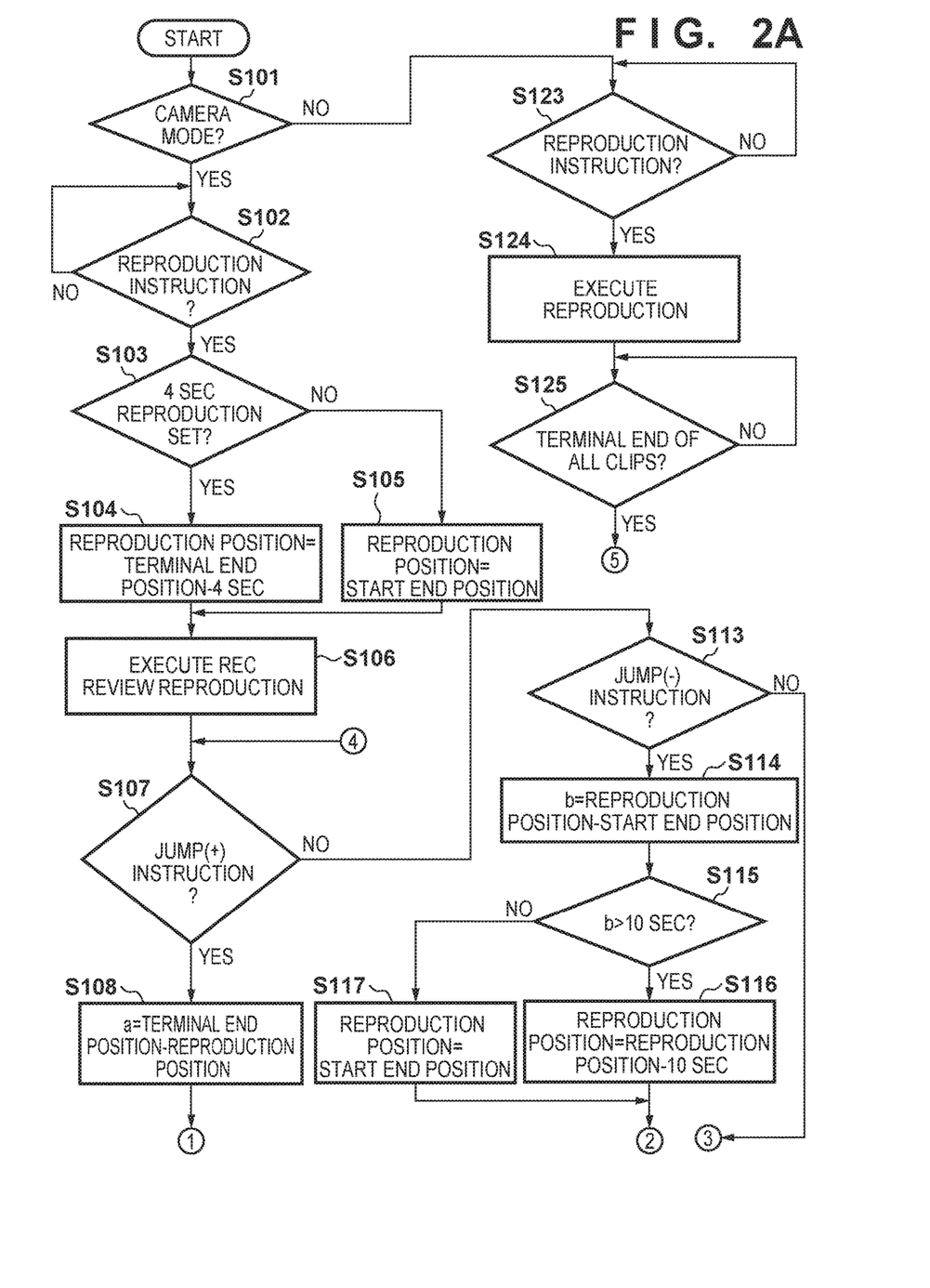
FIGS. 2A and 2B are flowcharts showing a reproduction processing sequence of one embodiment.
Figure 2B:
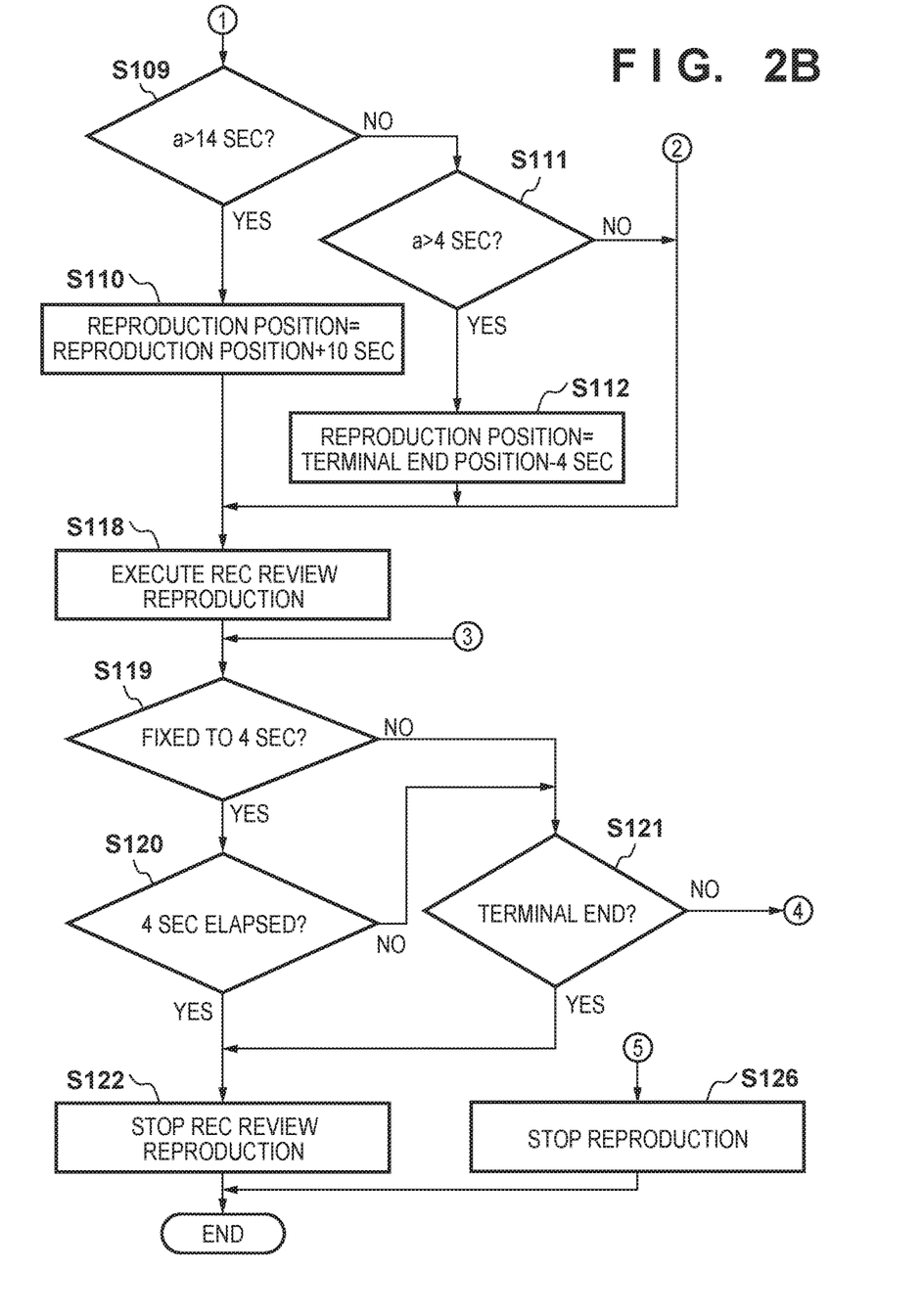

Note that the processing of FIGS. 2A and 2B is realized by the CPU 101 expanding and executing a program recorded on the ROM 103 in the RAM 102.

In step S101, the CPU 101 determines whether the current operational mode is the camera mode or the reproduction mode. In the case of the camera mode, the process proceeds to step S102, and in the case of the reproduction mode, the process proceeds to step S123.

In step S102, the CPU 101 determines whether there has been a reproduction instruction. Here, because there has been a reproduction instruction in the camera mode, the CPU 101 determines whether the REC REVIEW button included in the operation unit 10 has been pressed. If the determination result indicates that the REC REVIEW button has been pressed, the process proceeds to step S103, and if this is not the case, the CPU 101 waits at step S102 for the REC REVIEW button to be pressed. Note that, in addition to this determination, it is also determined whether there has been a moving image record instruction, whether there has been an instruction to switch to the reproduction mode, and whether there has been an instruction to display a setting menu, and processing is performed accordingly, although a detailed description thereof is omitted in the present embodiment.

In step S103, the CPU 101 determines whether 4-second reproduction is set. Here, it is determined how the REC review reproduction method illustrated above in FIG. 4 is set, with this determination being performed by reading setting information stored in the ROM 103. If the determination result indicates that "last 4 seconds" is set, the process proceeds to step S104, and if "from beginning of clip" is set, the process proceeds to step S105.

In step S104, the CPU 101 sets the reproduction start position of the REC review to a point that is 4 seconds before the terminal end (a point that is the second period before the terminal end position) of the clip shot last (most recent clip).

In step S105, the CPU 101 sets the reproduction start position of the REC review to the start end (beginning) of the latest clip.

In step S106, the CPU 101 starts moving image reproduction (performs REC review) from the reproduction start position of the REC review set at step S104 or step S105.

In step S107, the CPU 101 determines whether there has been an operation for jumping the reproduction position of the REC review in the positive direction. Here, an instruction to jump in the positive direction can be given by pressing the RIGHT button included in the operation unit 10. If there has been an instruction to jump in the positive direction (if the RIGHT button has been pressed), the process proceeds to step S108, and if this is not the case, the process proceeds to step S113.

In step S108, the CPU 101 calculates a difference a between the terminal end position of the clip and the current reproduction position, in order to determine the reproduction position after the jump.

In step S109, the CPU 101 determines whether the difference a between the terminal end position of the clip and the current reproduction position calculated at step S108 is more than 14 seconds (total period obtained by adding a first period (10 seconds) which is the standard number of seconds jumped in response to one jump instruction, to a second period (4 seconds) set as the minimum number of seconds that a REC review is reproduced). If the determination result indicates that the difference a is more than 14 seconds, the process proceeds to step S110, and if it is determined that the difference a is 14 seconds or less, the process proceeds to step S111.

In step S110, the CPU 101 sets the post-jump reproduction start position to a point that is 10 seconds after the current reproduction position (a point that is the first period after the current reproduction position). When the difference a between the terminal end position of the clip and the current reproduction position is more than 14 seconds, the REC review is executed for at least 4 seconds, which is the minimum number of reproduction seconds, even if a 10-second jump is performed in the positive direction, and thus the reproduction start position will be a position obtained by adding 10 seconds, which is the standard number of jump seconds, to the current reproduction position.

In the following step S118, the CPU 101 performs reproduction after jumping to the position set as the post-jump reproduction start position. A concept diagram in this case is shown in b1 of FIG. 5B. If the position that was being reproduced before the jump was a position 521, which is at least 14 seconds before the terminal end of the clip, the CPU 101 performs reproduction after jumping to a position 522, which is 10 seconds after the position 521, in response to an instruction to jump in the positive direction.

In step S111, the CPU 101, having determined that the difference a between the terminal end position of the clip and the current reproduction position is less than or equal to the total period, that is, less than or equal to 14 seconds, determines whether the difference a between the terminal end position of the clip and the current reproduction position is greater than 4 seconds. If the determination result indicates that the difference a is greater than 4 seconds, the process proceeds to step S112, and if the difference a is 4 seconds or less, the process proceeds to step S118 without executing a jump, and reproduction is continued from the current reproduction position.

In step S112, the post-jump reproduction start position is set to a point that is 4 seconds, which is the minimum number of reproduction seconds, before the terminal end of the clip (a point that is the second period before terminal end position).

In the following step S118, the CPU 101 performs reproduction after jumping to the position set as the post-jump reproduction start position. A concept diagram in this case is shown in b2 of FIG. 5B. If the position that was being reproduced before the jump was a position 523, which is at least. 4 seconds before the terminal end of the clip, the CPU 101 performs reproduction after jumping from the position 523 to a position 524 that is 4 seconds before the clip terminal end, in response to an instruction to jump in the positive direction. The time difference (number of jump seconds) between the position 523 and the position 524 in this case is 10 seconds or less, and differs according to the reproduction position 523 before the jump.

Figure 5B:
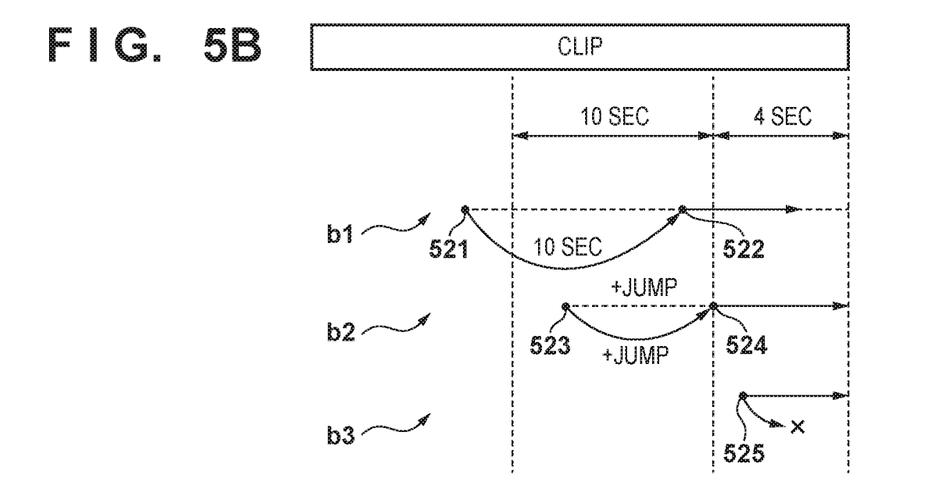

A concept diagram in the case where the CPU 101 determines at step S111 that the difference a between the terminal end position of the clip and the current reproduction position is 4 seconds or less and continues the reproduction at step S118 from the current position without executing a jump is shown in b3 of FIG. 5B. If the position that was being reproduced before the jump was a position 525, which is less than 4 seconds before the terminal end of the clip, reproduction is continued without performing a jump, even when there has been an instruction to jump in the positive direction.

In step S113, the CPU 101 determines whether there has been an operation for jumping the reproduction position of the REC review in a negative direction. Here, an instruction to jump in the negative direction can be given by pressing the LEFT button included in the operation unit 10. If there has been an instruction to jump in the negative direction (if the LEFT button has been pressed), the process proceeds to step S114, and if this is not the case, the process proceeds to step S119.

In step S114, the CPU 101 calculates a difference b between the current reproduction position and the beginning position of the clip, in order to determine the post-jump reproduction start position. In the case where, however, the number of seconds of the current reproduction position indicates the position from the beginning of the clip, this calculation does not particularly need to be performed.

In step S115, the CPU 101 determines whether the time from the beginning of the clip to the current reproduction position is longer than 10 seconds (standard number of jump seconds in response to one jump instruction). If it is determined that this time is longer than 10 seconds, the process proceeds to step S116, and if it is determined that this time is within 10 seconds, the process proceeds to step S117.

In step S116, the CPU 101 sets the post-jump reproduction start position to a point that is 10 seconds before the current reproduction position (a point that is the first period before the current reproduction position).

Figure 5C:
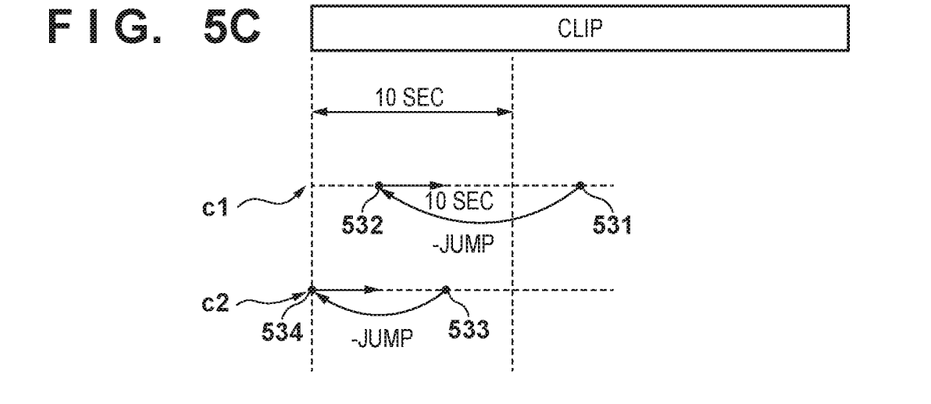

In the following step S118, the CPU 101 performs reproduction after jumping to the position set as the post-jump reproduction start position. A concept diagram in this case is shown in c1 of FIG. 5C. If the position that was being reproduced before the jump was a position 531, which is at least 10 seconds after the beginning of the clip, the CPU 101 performs reproduction after jumping to a position 532 that is 10 seconds before the position 531, in response to an instruction to jump in the negative direction.

In step S117, the CPU 101 sets the post-jump reproduction start position as the position of the beginning of the clip.

In the following step S118, the CPU 101 performs reproduction after jumping to the position set as the post-jump reproduction start position. A concept diagram in this case is shown in c2 of FIG. 5C. If the position that was being reproduced before the jump was a position 533, which is within 10 seconds from the beginning of the clip, the CPU 101 performs reproduction after jumping from the current reproduction position 533 to a position 534, which is the beginning of the clip, in response to an instruction to jump in the negative direction. The time difference (number of jump seconds) between the position 533 and the position 534 in this case is 10 seconds or less, and differs according to the reproduction position 533 before the jump.

In step S119, the CPU 101 determines whether the reproduction time of the REC review is fixedly set to 4 seconds. Here, the reproduction time of the REC review can be set according to a user operation from a setting menu, with one of "fixed to 4 seconds" and "until terminal end of clip" being set and recorded on the ROM 103. The CPU 101 determines whether the reproduction time is set as "fixed to 4 seconds", with reference to the setting information in the ROM 103. If the reproduction time is set as "fixed to 4 seconds", the process proceeds to step S120, and if this is not the case (i.e., if the reproduction time is set as "until terminal end of clip"), the process proceeds to step S121. Note that whether the reproduction time is fixedly set to 4 seconds may be determined as a specification of the video camera, rather than being set by the user. In the case where the reproduction time is fixedly set to 4 seconds as a specification of the video camera, the process proceeds to step S120 without the determination processing of step S119 being performed.

In step S120, the CPU 101 determines whether 4 seconds have elapsed from the latest reproduction start, out of the reproduction of the REC review performed at step S106 and the reproduction performed at step S118 after the jump. If 4 seconds has elapsed, the process proceeds to step S122, and if this is not the case, the process proceeds to step S121.

In step S121, the CPU 101 determines whether the current reproduction position has reached the terminal end of the clip. If the determination result, indicates that the terminal end has been reached, the process proceeds to 122, and if this is not the case, the CPU 101 returns to step S107.

In step S122, the CPU 101 automatically stops reproduction of the REC review and returns to a shooting standby state. That is, live view display of video captured by the video capturing unit 1 is performed on the display unit 8, and the video camera returns to a state of accepting a shooting instruction. Note that, in this example, the REC review is ended when 4 seconds elapses in the case where the reproduction time is fixedly set to 4 seconds or when the terminal end of the clip is reached, but the REC review can also be ended in other ways, such as by a stop instruction that results from the user pressing the STOP button or the like or by interrupt processing that results from a shooting instruction.

Note that if it is determined at step S101 that the current operational mode is not the camera mode, the video camera is in the reproduction mode. Reproduction in that case will be normal reproduction rather than the REC review. In normal reproduction, all of the clips can be targeted for reproduction in the case where a plurality of clips are recorded. If it is determined at step S123 that there has been a reproduction instruction (the REPRODUCE button included in the operation unit 10 has been pressed), the CPU 101 starts moving image reproduction at step S124. All of the clips positioned chronologically after the point at which reproduction was started are targeted for reproduction.

In step S125, the CPU 101 determines whether reproduction of all of the clips that are positioned chronologically after the reproduction start time has been completed. If reproduction of all of these clips has been completed, the process proceeds to step S126 and moving image reproduction is stopped. Note that moving image reproduction in the reproduction mode can also be ended in other ways, such as by a stop instruction that results from the user pressing the STOP button or the like or by interrupt processing that results from a shooting instruction. Also, it is assumed that fast forward or fast rewind of a moving image in response to the FAST FORWARD/FAST REWIND button included in the operation unit 10 being operated can also be performed during moving image reproduction in the reproduction mode. Also, it is assumed that jumping in the positive direction in response to the RIGHT button being pressed and jumping in the negative direction in response to the LEFT button being pressed can also be performed. In the case of jumping in the positive direction in the reproduction mode, however, a minimum number of reproduction seconds, such as the 4 seconds set in the REC review, is not set. Accordingly, if, in the case where an instruction to jump in the positive direction is given during reproduction of the clip 2 in FIG. 3, for example, the time to the terminal end of the clip 2 from the current reproduction position is longer than 10 seconds (even when total period is within 14 seconds), reproduction is performed after jumping 10 seconds forward from the current reproduction position. Also, if, in the case where an instruction to jump in the positive direction is performed during reproduction of the clip 2, the time from the current reproduction position to the terminal end of the clip 2 is within 10 seconds, the reproduction position is jumped to the terminal end of the clip 2 (beginning of the clip 3, which is the next clip), and reproduction is performed from the beginning of the clip 3.

The operation relating to jumping in the positive direction in the vicinity of the terminal end of a clip is performed differently between the REC review and the reproduction mode in this way for the following reasons. That is, the purpose of performing the REC review is to check the contents of the moving image that have just been shot. (the latest moving image, the moving image that was shot last). In this case, a use case is conceivable in which the user uses the REC review to help decide what kind of moving image to shoot next, by checking the vicinity of the terminal end of the moving image that has just been shot to see what kind of scene the moving image that was shot last ends with. Alternatively, a use case is conceivable in which the user uses the REC review to check whether the movement of an object that the user wanted to shoot was completely captured and to help decide whether the moving image needs to be reshot, by checking what kind of scene the moving image that was shot last ends with. In the REC review that is utilized when in a shooting mode, a configuration is thus adopted in which the terminal end of the clip is reproduced for a few seconds (4 seconds in the present example) at a minimum, even when an instruction from the user to jump in the positive direction is given. On the other hand, it is envisioned that a jump instruction during reproduction of a moving image in the reproduction mode will be given by a user to utilize jumping for the purpose of searching for a scene that he or she wants to reproduce for viewing, rather than for looking for ideas as to what to shoot next. Accordingly, fast scene searching is prioritized by jumping to the beginning of the next clip, if a jump instruction is given when the reproduction position is near the terminal end of the clip, rather than performing jumping to check the terminal end of the clip for a few seconds.

Note that although, in the present embodiment, an example was described in which the processing of steps S102 to S122 was applied to REC review in the video camera, the present invention is not limited thereto. For example, the present invention is also applicable to reproduction in the reproduction mode of the video camera, and to jumping of the reproduction position during general moving image reproduction in another moving image reproduction device. The vicinity of the terminal end of the moving image that is being viewed can thereby be quickly and reliably checked.

Furthermore, although, in the present embodiment, jumping of the reproduction position in moving image reproduction was described, the present invention is also similarly applicable to jumping of the reproduction position in the reproduction of audio, which is time series data. Note that, also in the case where the present invention is applied to audio reproduction, it is more suitable to divide the processing according to whether the mode is an operational mode for reproducing audio that was recorded last in an audio recording mode or a mode for reproducing audio in the reproduction mode, similarly to the example illustrated with FIGS. 2A and 2B. That is, in the case of reproducing the most recently recorded audio in the audio recording mode, processing similar to step S102 to step S122 is performed in relation to audio, such that a few seconds (4 seconds in the example in FIGS. 2A and 2B) at the end of the audio clip is reproduced. In the case of reproducing audio in the reproduction mode, fast searching is prioritized by jumping to the beginning of the next clip, if a jump instruction is given when the reproduction positron is near the terminal end of an audio clip, rather than performing jumping to check the terminal end of the clip for a few seconds.

Note that a single item of hardware may perform the control that the CPU 101 performs as described in the embodiments, or the entire apparatus may be controlled by a plurality of items of hardware sharing processing.

Although the present invention has been elaborated above based on suitable embodiments thereof, the present invention is by no means limited to these specific embodiments and includes various modifications without departing from the concept of the present invention. The above embodiments are merely illustrative embodiments of the present invention, and may be combined where appropriate.

Although the above embodiments have described, an example in which the present invention is applied to a reproduction control apparatus such as a digital video camera, the present invention is not limited to this example. The present invention is applicable to, for example, an apparatus capable or making a reproduction position of time series data such as moving images and audio jump in forward/backward directions. More specifically, the present invention is applicable to a personal computer, a PDA (Personal Digital Assistant), a mobile telephone terminal, a mobile image viewer, a digital camera, a video recorder, an audio recorder, a video player, a music player, a game console, an electronic book reader, and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-069805, filed Mar. 30, 2015 which is hereby incorporated by reference herein in its entirety.

What is claimed is:

1. A reproduction control apparatus comprising:
an instruction unit configured to give an instruction so as to move a reproduction position of time series data; and
a control unit configured to perform, when there is an instruction from the instruction unit to move the reproduction position forward, control to move a current reproduction position forward by a first period in a case where a remaining time from the current reproduction position to a terminal end is longer than a total period of the first period and a second period, and to move the current reproduction position to a position that is the second period before the terminal end in a case where the remaining time is less than or equal to the total period and longer than the second period.

2. The apparatus according to claim 1, wherein the first period is longer than the second period.

3. The apparatus according to claim 1, wherein the control unit performs control to not move the current reproduction position in a case where the remaining time is shorter than the second period.

4. The apparatus according to claim 1, wherein the control unit stops reproduction automatically upon reproduction being performed for a time of a same length as the second period after moving the current reproduction position.

5. The apparatus according to claim 1, wherein the control unit accepts the instruction to move the reproduction position from the instruction unit during reproduction of the time series data.

6. The apparatus according to claim 1, wherein when there is an instruction from the instruction unit to move the reproduction position backward, the control unit performs control to move the current reproduction position backward by the first period in a case where a remaining time from the current reproduction position to a start end is longer than the first period, and to move the current reproduction position to the start end in a case where the remaining time is less than or equal to the first period.

7. The apparatus according to claim 1, wherein
the apparatus is switchable to a first mode in which a range to be reproduced is limited to one selected piece of time series data or to a second mode in which the range to be reproduced includes a plurality of pieces of time series data, and
the control unit, in the first mode, performs the control for moving the reproduction position, and, in the second mode, performs control to move the current reproduction position forward by the first period, in a case where the remaining time is longer than the first period, even if the remaining time is less than or equal to the total period.

8. The apparatus according to claim 1, wherein
the apparatus is switchable to a first mode in which a range to be reproduced is limited to one selected piece of time series data or to a second mode in which the range to be reproduced includes a plurality of pieces of time series data, and
the control unit, in the first mode, performs the control for moving the reproduction position, and, in the second mode, performs control to move the current reproduction position to the terminal end of the time series data that is being reproduced or to a beginning of time series data that follows the time series data that is being reproduced, in a case where the remaining time is less than or equal to the total period.

9. The apparatus according to claim 7, wherein
the first mode is an operational mode associated with a reproduction instruction given in a recording mode for recording time series data,
the second mode is an operational mode for reproducing recorded time series data.

10. The apparatus according to claim 1, wherein the time series data includes at least one of moving image and audio.

11. A control method of a reproduction control apparatus comprising:
giving an instruction so as to move a reproduction position of time series data; and
performing, when there is an instruction to move the reproduction position forward, control to move a current reproduction position forward by a first period in a case where a remaining time from the current reproduction position to a terminal end is longer than a total period of the first period and a second period, and to move the current reproduction position to a position that is the second period before the terminal end in a case where the remaining time is less than or equal to the total period and longer than the second period.

12. A non-transitory computer-readable storage medium storing a program for causing a computer to function as an instruction unit and a control unit of a reproduction control apparatus,
wherein the instruction unit gives an instruction so as to move a reproduction position of time series data, and
the control unit performs, when there is an instruction from the instruction unit to move the reproduction position forward, control to move a current reproduction position forward by a first period in a case where a remaining time from the current reproduction position to a terminal end is longer than a total period of the first period and a second period, and to move the current reproduction position to a position that is the second period before the terminal end in a case where the remaining time is less than or equal to the total period and longer than the second period.

* * * * *